United States Patent [19]

Simmons

[11] Patent Number: 5,617,707
[45] Date of Patent: Apr. 8, 1997

[54] STRETCH WRAP FILM INHERENTLY EXHIBITING A SIGNIFICANT CLING PROPERTY

[75] Inventor: Kathryn Simmons, Macedon, N.Y.

[73] Assignee: Mobil Oil Corporation, Fairfax, Va.

[21] Appl. No.: 639,044

[22] Filed: Apr. 16, 1996

Related U.S. Application Data

[60] Continuation of Ser. No. 378,192, Jan. 25, 1995, abandoned, which is a division of Ser. No. 903,295, Jun. 24, 1992, abandoned, which is a continuation-in-part of Ser. No. 296,930, Jan. 12, 1989, abandoned, which is a continuation of Ser. No. 39,892, Apr. 17, 1987, abandoned.

[51] Int. Cl.$^6$ ........................................... B65B 53/00
[52] U.S. Cl. ............... 53/441; 53/399; 428/212; 428/323; 428/516; 428/906; 428/911; 428/913; 524/581
[58] Field of Search ............. 53/441, 399; 428/212, 428/323, 516, 906, 911, 913; 524/581

[56] References Cited

U.S. PATENT DOCUMENTS

| | | | |
|---|---|---|---|
| 3,645,992 | 2/1972 | Elston | 260/80.78 |
| 3,986,611 | 10/1976 | Dreher | 206/386 |
| 4,011,382 | 3/1977 | Levine | 526/96 |
| 4,076,698 | 2/1978 | Anderson et al. | 526/348 |
| 4,079,565 | 3/1978 | Lancaster, III et al. | 53/3 |
| 4,163,831 | 8/1979 | Gessell | 526/153 |
| 4,205,021 | 5/1980 | Morita et al. | 525/240 |
| 4,243,619 | 1/1981 | Fraser | 264/40.6 |
| 4,302,565 | 11/1981 | Goeke et al. | 526/88 |
| 4,302,566 | 11/1981 | Karol et al. | 526/125 |
| 4,311,808 | 1/1982 | Su | 525/222 |
| 4,327,009 | 4/1982 | Allen | 524/114 |
| 4,359,561 | 11/1982 | Fraser et al. | 526/88 |
| 4,363,904 | 12/1982 | Fraser | 526/348.2 |
| 4,367,256 | 1/1983 | Biel | 428/218 |
| 4,379,197 | 4/1983 | Cipriani | 428/220 |
| 4,399,173 | 8/1983 | Anthony et al. | 428/35 |
| 4,399,180 | 8/1983 | Briggs et al. | 428/212 |
| 4,405,495 | 9/1983 | Lee | 526/125 |
| 4,409,776 | 10/1983 | Usui | 53/399 |
| 4,418,114 | 11/1983 | Briggs et al. | 428/218 |
| 4,425,268 | 1/1984 | Cooper | 524/110 |
| 4,436,788 | 3/1984 | Cooper | 428/483 |
| 4,450,457 | 5/1984 | Dobreski | 523/100 |
| 4,511,609 | 4/1985 | Craver | 428/35 |
| 4,518,654 | 5/1985 | Eichbauer et al. | 428/331 |
| 4,521,573 | 6/1985 | Lee et al. | 526/125 |
| 4,522,987 | 6/1985 | Hogan et al. | 526/106 |
| 4,704,439 | 11/1987 | Yamaoka | 525/334.1 |
| 4,738,942 | 4/1988 | Nowlin | 502/104 |
| 4,793,956 | 12/1988 | Nogiwa | 264/41 |
| 4,833,017 | 5/1989 | Benoit | 428/323 |

FOREIGN PATENT DOCUMENTS

| | | |
|---|---|---|
| 9193082 | 12/1982 | Australia . |
| 0047634 | 9/1981 | European Pat. Off. . |
| 0067138 | 5/1982 | European Pat. Off. . |
| 0109512 | 9/1983 | European Pat. Off. . |
| 0161060 | 4/1985 | European Pat. Off. . |
| 147088A | 7/1985 | European Pat. Off. . |
| 52-86440 | 7/1977 | Japan . |
| 19528 | 2/1980 | Japan . |

OTHER PUBLICATIONS

Exxon Chemical sales literature—Escorene AL3004YB, Jul. 1986.
Exxon Chemical literature—Escorene LL–3003, Oct. 1993.
Specialty Plastics Conference in 1985, The Impact of LLDPE on the West European Polyethylene Conversion Industry: "What is a Good Stretch Film" by W. Brueck.
Specialty Plastics Conference in 1985, The Impact of LLDPE on the West European Polyethylene Conversion Industry: "State of the Art for Resins, Machines and Markets for LLDPE Stretch Film" by M. Le Govic et al.
Patricia Goodfriend, Cooperation Results in Coextrusion Creativity, Paper, Film and Foil Converter, Oct. '85, AT 49.

*Primary Examiner*—Peter D. Mulcahy
*Attorney, Agent, or Firm*—Malcolm D. Keen

[57] ABSTRACT

A monolayer or multilayer (i.e., a composite or laminate) stretch wrap film is fabricated from a linear low density polyethylene (LLDPE) possessing a significant level of cling force not attributable to added cling component. The inherent cling force is due to the presence of a relatively high level of n-hexane extractibles in the LLDPE resin.

123 Claims, No Drawings

STRETCH WRAP FILM INHERENTLY EXHIBITING A SIGNIFICANT CLING PROPERTY

This is a continuation of application Ser. No. 08/378,192, filed on Jan. 25, 1995, now abandoned which is a division of application Ser. No. 07/903,295 filed on Jun. 24, 1992 now abandoned which is a continuation-in-part of application Ser. No. 296,930, filed Jan. 12, 1998, now abandoned which in turn is a file wrapper continuation of Ser. No. 039,892, filed Apr. 17, 1987 now abandoned.

BACKGROUND OF THE INVENTION

This invention relates to stretch wrap thermoplastic film, methods for forming a unitized plurality of goods, e.g., a pallet load, by application of stretch wrap film thereto and the stretch-wrapped units resulting therefrom. The invention is particularly concerned with a stretch wrap film based on linear low density polyethylene (LLDPE) possessing a significant cling force due to the presence of a relatively high level of n-hexane extractibles therein. The invention is also concerned with a stretch wrap film having an exceptionally low unwind noise level.

The use of thermoplastic stretch wrap film for the overwrap packaging of goods and, in particular, the unitizing of pallet loads, constitutes a commercially significant application of polymer film. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overlapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Some resins which have been used in the fabrication of stretch wrap film are polyethylene, polyvinyl chloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application.

LLDPE and methods for its manufacture are described in, among others, U.S. Pat. Nos. 3,645,992; 4,076,698; 4,011,382; 4,163,831; 4,205,021; 4,302,565; 4,302,566; 4,359,561; 4,521,573 and 4,522,987. Although it is known from these disclosures that LLDPE can be extruded into films, there is no mention or suggestion in any of them that a useful stretch wrap possessing an inherent cling property can be manufactured from an LLDPE having a relatively high level of n-hexane extractibles, e.g., an amount of such extractibles of at least 3.5 weight percent for a film of about 1.5 mils thickness. The LLDPE films of commerce typically possesses levels of n-hexane extractibles which are well below this.

Thermoplastic films possessing a cling property are known in the art. U.S. Pat. No. 4,311,808 describes a cling film containing a homogeneous mixture of polyisobutylene, ethylene-propylene and a low density polyethylene. There is no specific mention of an LLDPE resin component in the film of this patent. U.S. Pat. No. 4,367,256 describes a cling wrap plastic film based on a blend of high pressure low density polyethylene (HPLDPE) and LLDPE in which the latter resin represents from 5–16 weight percent of the total. In one embodiment, this film is sandwiched between two HPLDPE films. Although a 100% LLDPE film is disclosed for comparison purposes, no mention is made of its n-hexane extractibles content. U.S. Pat. No. 4,399,173 describes a multilayer plastic film free of melt fracture which is suitable for a variety of applications including, by implication, the stretch wrapping of goods. The film possesses a core layer of LLDPE resin of melt index 0.2–3.0 decigrams per minute and skin layers of LLDPE resin of melt index 5.0–20.0 decigrams per minute. The patent lacks any disclosure or suggestion of an LLDPE film possessing a cling property as a result of the presence of a relatively high level of n-hexane extractibles. U.S. Pat. Nos. 4,399,180 and 4,418,114 describe a coextruded composite stretch wrap film in which an LLDPE core layer is surfaced with HPLDPE skin layers. In the one-sided cling stretch wrap film of U.S. Pat. No. 4,518,654, layer A fabricated from a resin possessing an inherent cling property and/or a cling property resulting from the incorporation of a cling additive therein is coextruded with layer B fabricated from a resin exhibiting little if any cling. In each of the two working examples of this patent, layer A is an LLDPE film containing a cling additive, i.e., polyisobutylene in both cases. There is no hint whatever in this patent of an LLDPE film possessing an inherent cling property resulting from the presence of a relatively high level of n-hexane extractibles. U.S. Pat. No. 4,436,788 describes a stretch wrap film obtained from a mixture of 40–90 weight percent ethylene-vinyl acetate copolymer and 8–55 weight percent LLDPE. No mention is made of a relatively high n-hexane extractibles LLDPE component. Japanese Laid-Open Patent No. 19528/1980 describes a two-layer stretch wrap film in which a low density polyethylene layer is coextruded with a low density polyethylene layer containing from 3 to 20 weight parts of a tackifier, e.g., a polyisobutylene having a molecular weight of 200 to 300. The use of an LLDPE resin containing a relatively high level of n-hexane extractibles is neither mentioned nor suggested in this disclosure.

As previously indicated, methods of stretch wrapping articles, containers, etc., are known. U.S. Pat. No. 3,986,611 describes a tension-wrapped palletized load obtained with a stretch wrap film possessing a cling additive. LLDPE films are neither disclosed nor suggested in this patent. U.S. Pat. No. 4,079,565 describes a stretch-wrapped package, process and apparatus which employs a stretch wrap polyethylene film. No mention whatever is made of an LLDPE stretch wrap film much less one possessing an inherent cling property. U.S. Pat. No. 4,409,776 discloses a method and apparatus for packing articles with a composite stretch wrap film one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer. There is nothing in this patent which would suggest the use of an LLDPE possessing an inherent cling property (or "adhesive" characteristic to use patentee's term). If anything, U.S. Pat. No. 4,409,776 suggests that an LLDPE resin should be reserved for the "nonadhesive", which is to say, non-cling, layer of the composite film.

It is an object of the present invention to provide a monolayer LLDPE stretch wrap film possessing a significant inherent cling property on at least one of its major surfaces without the addition of a cling additive to the film.

It is another object of the present invention to provide a coextruded multilayer stretch wrap film in which at least one outer film layer is fabricated from an LLDPE imparting an inherent cling property to the exposed surface of the layer in the absence of cling additive.

It is still a further object of this invention to provide a coextruded AB stretch wrap film structure in which film layer A is derived from an LLDPE inherently exhibiting an appreciable level of cling without the use of cling additive and film layer B is derived from a resin which exhibits no appreciable cling to a layer of itself and optionally, has a slide property when in contact with a layer of itself with relative motion therebetween.

It is yet another object of the invention to provide a stretch wrap cling film having the lowest known unwind noise level.

Other objects of the invention include the use of a stretch wrap film of the aforementioned characteristics in the overwrapping of a plurality of goods, e.g., a pallet load, to provide a unitized packaged unit.

SUMMARY OF THE INVENTION

In accordance with the foregoing objects, a stretch wrap film is provided which comprises at least a first layer fabricated from a thermoplastic linear low density polyethylene inherently possessing a significant cling property in the absence of added cling component and containing a relatively high level of n-hexane extractibles.

The stretch wrap film of this invention can be used to overwrap one or a group of articles to form a unitized packaged unit employing any of the known and conventional tension-wrapping techniques such as those described above.

DESCRIPTION OF THE PREFERRED EMBODIMENTS

The term "linear low density polyethylene" (LLDPE) is to be understood in the generally recognized sense of a copolymer of ethylene and small amounts, e.g., from 1 to about 10 weight percent, of at least one other copolymerized alpha-monoolefin comonomer possessing from 4 to about 10, and preferably, from 4 to 8, carbon atoms. Typical comonomers include butene-1, 1,3-methyl-butene-1, 1,3-methyl-pentene-1, hexene-1, 4-methylpentene-1, 3-methyl-hexene-1, octene-1, decene-1, etc. The LLDPE resins are prepared at relatively low pressures employing coordination-type catalysts. Reference may be made to U.S. Pat. Nos. 3,645,992; 4,076,698; 4,011,382; 4,163,831; 4,205,021; 4,302,565; 4,302,566; 4,359,561; 4,521,573 and 4,522,987, supra, for more details of the manufacture and properties of LLDPE resins including those which are useful herein. However, not all LLDPE resins are suitable for fabricating the stretch wrap film of this invention. It has been discovered that only those LLDPE resins possessing a relatively high weight percentage of n-hexane extractibles are suitable for this purpose. A correlation between cling and the level of such extractibles has been observed lending support to the view that the extractibles are indeed responsible for the cling behavior. It is an essential requirement that the level of n-hexane extractibles be such as to provide a film inherently exhibiting an appreciable level of cling. A level of less than 3 wt. % n-hexane extractibles will not provide an acceptable level of cling for commercial purposes. As measured by the n-hexane extractibles method described in 21 C.F.R. 177.1520 to which reference may be made for specific details, an LLDPE film of about 1.5 mils thickness containing from 3.5 weight percent up to as high as 15 weight of such extractibles will exhibit a significant level of cling. Preferably, the LLDPE film or film layer herein will contain from 3.5 to about 10 and still more preferably, from about 4 to about 8, weight percent of n-hexane extractibles.

The level of n-hexane extractibles in the film of this invention can also be expressed in terms of a specific cling force. Employing the test procedure hereinafter described, the n-hexane extractible component of the LLDPE film should be such as to provide a cling force of at least about 140 grams, preferably at least about 200 grams. Cling forces exceeding 200 grams, e.g., 300–400 grams, are also within the scope of this invention.

The preferred high n-hexane extractibles LLDPE resins of this invention have a density ranging from about 0.905 to about 0.940 gm/c.c. and a melt index of from about 1 to about 6.

The LLDPE resin can be blended or alloyed with minor amounts, e.g., up to about 20 weight percent total, of one or more other suitable resins to achieve a range of physical/mechanical properties in the film product. Thus, for example, such resins as EVA copolymer, HPLDPE and other LLDPE resins possessing conventionally low levels of n-hexane extractibles can be incorporated in the high n-hexane extractibles LLDPE herein in the foregoing amounts.

It is further within the scope of this invention to provide a multilayer stretch wrap film in which the high n-hexane extractibles LLDPE film of this invention constitutes at least one of the two outer layers of the composite film structure. For example, the LLDPE film herein can constitute outer layer A of a coextruded AB film structure in which layer B is a film fabricated from a flexible film-forming resin possessing little, if any, inherent cling property, e.g., an LLDPE containing the low levels, e.g., less than about 3 weight percent, of n-hexane extractibles which are characteristic of most commercial LLDPE film-grade resins, a high pressure low density polyethylene (HPLDPE), preferably one having a density ranging from about 0.890 to about 0.940 gm/cc 15 and a melt index ranging from about 1–25, isotactic polypropylene, ethylene-propylene copolymer, polyester, polyamide, etc. As in the case of the high n-hexane extractibles LLDPE resin, these and other non-cling resins can be provided as blends, or alloys, of two or more compatible non-cling resins but in virtually any ratio desired. Other useful structures include a coextruded ABA composite film in which both outer, or skin, layers A are obtained with the high n-hexane extractibles LLDPE film herein and core layer B is fabricated from one of the aforementioned non-cling resins, and a coextruded ABC composite film in which layers A and B are as previously described and surface layer C is fabricated from yet another non-cling resin. If desired, the resin from which the B layer is fabricated can be selected for its barrier properties.

The LLDPE resins which are useful herein can contain known and conventional cling additives to augment the cling property which is already inherently exhibited by the resins. Examples of useful cling additives include polyisobutylenes having a number average molecular weight in the range of from about 1,000–3,000 grams per mole as measured by vapor phase osmometry, amorphous atactic polypropylenes, e.g., those having an average molecular weight of about 2000, polyterpenes and ethylene-vinyl acetate copolymers containing from about 5–15 weight percent copolymerized vinyl acetate. The optional cling additive can be present in the A layer in a concentration of from about 0.5 to about 10 pounds per 100 pounds of resin. Such additives will adversely affect the unwind noise level of the films. Of course, other conventional film additives such as antioxidants, UV stabilizers, pigments, dyes, etc., can be present in the usual amounts.

In the multilayer films of this invention possessing a non-cling surface layer, said layer can contain an anti-cling additive and/or any other component which imparts a capability for relative movement between this layer and an adjacent layer of itself. This embodiment overcomes the problem, noted in U.S. Pat. No. 4,518,654, supra, of the tendency of a pallet load overwrapped with a stretch wrap film possessing cling on both of its major surfaces from destructively pulling away from a similarly overwrapped pallet load with which it is in contact when one of the pallet loads is moved relative to the other (as would be the case in the fork lift truck-handling of such overwrapped pallet loads stored in a warehouse). The anti-cling additive present in the non-cling exterior layer can be any of those previously known to be useful for this purpose, e.g., crystalline and amorphous silicas, a synthetic sodium aluminum silicate such as $Na_2O.Al_2O_3.S_iO_2.4H_2O$, diatomaceous earth, talc, etc., having a particle size range of from about 0.5 to about 20 microns. The anti-cling agent can be present in a widely ranging amount, e.g., from about 500 to about 20,000 ppm. Other additives, e.g., any of those previously mentioned, as well as anti-blocking agents, coefficient of friction (COF) reducing agents, etc., can be present in the non-cling layer(s) of the multilayer film embodiment of this invention.

Film thickness, whether of a monolayer or a multilayer film, can vary widely and, in general, can be a thickness which is typical for stretch wrap films. A total film thickness of from about 0.4 to about 2.5 mils, preferably from about 0.5 to about 0.9 mils, is suitable for most applications. In the case of multilayer films constructed in accordance with this invention, the high n-hexane extractibles LLDPE outer layer(s) can represent from about 10 to about 90, and preferably from 30 to about 80, percent of the total gauge thickness with the other layer(s) representing the balance of the thickness.

Either or both major surfaces of the film can be treated by such known and conventional post-forming operations as corona discharge, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use or it can be provided as a pre-stretched film with little, if any, additional stretch being applied to the film at the time of use. Thus, the film herein can have a stretch capability of up to about 400 linear percent during the overwrapping operation.

Where the manufacture of a multilayer film is concerned, it is preferred to employ known and conventional techniques of coextrusion to assemble the composite structure. Reference may be made to U.S. Pat. No. 3,748,962, the contents of which are incorporated by reference herein, for details of a coextrusion procedure which can be employed in the fabrication of a multilayer film in accordance with this invention.

In the examples which follow, the procedures for determining the amount of n-hexane extractibles present in the LLDPE films and the cling fore exhibited by the films were as follows:

A. LLDPE n-Hexane Extractibles (21 C.F.R. 177.1520)

A 2.5 gram sample of an LLDPE film of 1.5 mils thickness is introduced to a two-liter capacity, straight-walled Pyrex resin kettle fitted with an electric heating mantle and a three-hole ground glass cover. The cover is fitted with a thermometer, a gas-tight stirrer and a reflux condenser. To prevent contamination of the rapidly evaporating n-hexane (spectrograde) by dust, a special "gas" cover in the form of an inverted flat Pyrex crystallizing dish of a size to fit a 1-litter beaker (e.g., 190 mm×100 mm) is provided. Through the center of the dish are sealed an inlet tube for preheated, dry nitrogen (containing less than 10 parts per million of oxygen), and an outlet tube located 1 inch off center. Nitrogen is fed through ¼ inch stainless steel tubing immersed in the same steam bath used to supply heat for solvent evaporation.

One liter of n-hexane is introduced to the kettle and the top is clamped in position. The flow of water through the jacket of the reflux condenser is begun and the stirrer activated. The heating jacket is set to provide and maintain a temperature of 50° C. Exactly 2 hours after the contents of the kettle have reached 50° C., the warm n-hexane is decanted through coarse filter paper; the filtrate is collected in a tared, glass-stoppered Erlenmyer flask of 1-liter capacity and the weight of the filtrate determined. About half of the solvent filtrate is transferred to a 1-liter beaker which is placed on an opening in the steam bath and immediately covered with the aforedescribed "gas" cover supplied with dry nitrogen flowing through the stainless steel coil which has been immersed directly in the steam bath. A positive flow of warm nitrogen gas is maintained throughout the evaporation of the n-hexane solvent, the remainder of the filtrate from the Erlenmyer flask being added as evaporation proceeds. When the volume of the n-hexane has been reduced to about 50 milliliters, the concentrated liquid is transferred to a previously tared weighing dish of suitable size. The beaker is washed twice with 20–30 milliliter portions of warm solvent the washings are added to the weighing dish while the remainder of the solvent continues to evaporate under the gas cover with its flow of warm nitrogen directed toward the center of the dish. The weighing dish with its residue is transferred to a vacuum desiccator and permitted to remain overnight (at least 12 hours) after which the net weight of the dry residue is determined to the nearest 0.0001 gram.

B. Cling Force

As measured by this procedure, cling is the film property which causes it to adhere to itself or to another specified surface, e.g., a film surface fabricated from a different resin.

Apparatus

1. Testing machine with a constant rate of grip separation. For example, an Instron machine equipped as follows:
    a. One lightweight jaw equipped with 1"×1½" flat rubber faced grips.
    b. Cling attachment.
    c. 500 gram load cell or 10 lb. load cell.
    d. If using pneumatic grips, air supply 60–70 psig with Daltech filter model 110 (or equal)—Daltech Engineering, Century Park, New Castle, Del.

2. 5"×20" sample template
3. 2"×6½" sample template
4. Sample cutter—JDC precision sample cutter, one inch width. Manufacturer: Thwing-Albert Instrument Co., Philadelphia, Pa.
5. Safety razor blade
6. 2"–3" wide soft bristled paint brush
7. 12" clear plastic ruler
8. ½" wide double-coated tape (scotch No. 665 of the 3M Corporation, or equivalent)
9. 5"×8" piece of glass.

Procedure

A. Instrument Preparation

1. Install load cell and allow 15 min. warm-up period. Note: Install upper lightweight jaw if using 500 gram load cell. On Instron Model 1130 toggle switch adjacent to full scale load knob to be in 'M' position when using gram load cell.
2. Remove lower Instron jaw and install cling attachment using locking pin to secure.
3. Zero, balance, and calibrate the Instron.
4. Feed the end of the string not fastened to the clamp through the pulley on the cling attachment and place in the center of the upper jaw.
5. When the clamp resting at the base of the incline (which is in position on the base plate), adjust the crosshead, or the amount of string pulled through the grips, or both in combination, to achieve a distance of 5"–7" between the top of the pulley and the bottom of the grips. Tighten the upper jaw. Adjust the crosshead return stop as necessary.
6. Install gears for 5"/min. crosshead speed and 20"/min. chart speed. Be sure they are correctly meshed.

B. Preparation Test Films

1. From the sample to be tested, cut a full width by min. 30" long sheet of clean film, peeling back several wraps if necessary. Mark the machine direction (MD) on the sheet sample.
2. Place the sheet sample on a clean glass cutting surface and smooth out wrinkles by grasping at corners or edges. Do not touch film test surface.
3. Using sample templates and safety razor blade, cut a 5" TD×20" MD sample and from the same MD location, a 2" TD×6½" MD sample from the sheet sample.
4. Label the inside surface of the test specimens prior to taking off the cutting table, with for example, the letter A. Optionally, label the outside surface (letter B). Marks should not be located in test surface area.
5. Place the 2"×6½" sample, inside surface (A) up, between two clean pieces of paper and use the ODC cutter to obtain a 1" TD×6½" MD sample sandwich. Note: Sample edges must be clean cut.

Discard and recut if they are not. Slow operation of the cutter will usually help give a clean cut.

Test Operation

Note: All testing to be inside surface (A) to outside surface (B) unless otherwise specified. Run Instron on 1 lb. Full Scale Load if using 10 lb. load cell.

1. Life the incline plane fixture from the cling attachment base plate. Place the 5"×20" sample, inside surface (A) down, on the base plate with the end of the sample flush with the end of the base plate.
2. Reset the incline plane fixture in the slots on the base plate.
3. Grasp the corners of the film sample extending beyond the base of the incline plane, pull back over the plane surface tautly, eliminate wrinkles in the test area, and clamp. A slight amount of stretching of the film is acceptable. Do not touch the sample test area. (The sample test area is the area between the two parallel lines running the length of the incline).
4. Grasp the 1"×6½" paper/film/paper sample sandwich between thumb and forefinger near one end. Slice approximately ½" of the film past the ends of the paper. Do not tough sample test surface with fingers (side that is in contact with the paper).
5. With the paint brush in the other hand, place the end of the film sample directly on the horizontal mark at the top of the incline with the sides between the two parallel lines drawn on the incline.
6. Lay the film sample with paper still in place down between the two parallel lines to determine whether the sample was placed squarely at the top. Insuring a square cut on the sample end will help eliminate this problem.
7. If the sample does not appear to fall within the lines without wrinkling, pull up the sample and reposition following step 5. Discard sample and recut if sample is not positioned properly after three attempts.
8. Once the sample is positioned squarely, brush the sample end down with moderate pressure. Grasp the opposite end of the paper which is laying between the parallel lines and slowly pull the paper away from the film following it at the other end with the brush to insure good contact between the sample surfaces (apply moderate, consistent pressure on the brush and do not re-brush the sample).
9. The 1"×6½" sample must lay between the marks on the incline with no wrinkles and a minimum of air bubbles. Sample may be partially lifted and reset with moderate brush stroke a maximum of three times before having to be discarded and recut.
10. Place a small piece of double-coated tape on the end of the film sample and place squarely in the clamp attached to the string. (The tape will help eliminate slippage in the clamp during testing.)
11. Locate the chart pen on a major horizontal division on the chart paper.
12. Turn the chart pen on.
13. Activate crosshead.
14. When the film has separated to the lower horizontal mark on the incline, turn the chart on.
15. When the two film layers have completely separated, turn the chart and pen off, return the crosshead, and remove the film samples.
16. Repeat steps 1–15 for each replicate.

Calculations

The film layers are separated at a constantly changing angle, thus the force required to separate the layers is also changing. To standardize the results, the cling value is calculated from that point on the curve where the string attached to the sample is horizontal with the base plate.

1. Draw a straight line through the best average slop of the curve. Recommended procedure: Place the ends of the clear ruler at the starting and ending points of the curve. Move the ruler right or left, maintaining the original angle, until the best average is achieved.
2. Count the number of vertical chart divisions between the point the chart is turned on and the point the film layers separate. Round to the nearest 0.1.

3. Multiply number of chart divisions (from Step 2) by 0.45. Round to the nearest 0.1.
4. From the point the chart was turned on, count up number of chart divisions from Step 3, drawing a horizontal line at this point through the slope. Record the chart reading at the point of intersect in chart divisions rounding to the nearest 0.1.
5. Calculate cling force as follows: Cling, $$gms = \frac{CR \times FSL}{D}$$

Where:
CR=Chart reading at intersect (in chart divisions)
FSL=Full scale load (gms)
D=Number of chart scale divisions (typically 100 for most Instron chart paper)

COMPARATIVE EXAMPLE 1

Dow 2088 LLDPE (ethylene-octene-1 copolymer) containing approximately 2 to 2.5 weight percent n-hexane extractibles at 520° F. was extruded through a slot die onto a cast roll at line speeds of 750 ft/min to provide a film. The cling force of this film was 65 gm, a level of cling too low for a commercial stretch wrap film, Cling agent would have to be added to this film to provide an acceptable cling force.

Example 1

Comparative Example 1 was substantially repeated but with Dow 4002 LLDPE (ethylene-octene-1 copolymer) containing approximately 3.5 weight percent n-hexane extractibles. The film possessed a cling force of 163 gm. This is a significant cling force and renders the film suitable for commercial stretch wrap application with or without the presence of added cling agent.

Example 2

Comparative Example 1 was substantially repeated but with Exxon LL3003.55 LLDPE (ethylene-hexene-1 copolymer) containing approximately 6 to 6.5 weight percent n-hexane extractibles, The film possessed a cling property of 212 gm which is entirely acceptable for commercial wrap application.

Example 3

Employing the coextrusion procedure of U.S. Pat. No. 3,748,962, an A/B composite film of 0.9 mils thickness is formed composed of an 80% A layer thickness of the LLDPE of Example 2 and a 20% B layer thickness of HPLDPE having a melt index of 2.0 and a density of 0.920 gm/c.c. and containing 5,000 PPM of a synthetic sodium aluminum silicate of the approximate formula $Na_2O \cdot Al_2O_3 \cdot 2SiO_2 \cdot 4H_2O$. The film demonstrates good cling on the exposed surface of layer A and a slide property on the exposed surface of non-cling layer B.

In the following Examples a series of four stretch cling films were measured for relative unwind noise (decibels) under commercial unwind conditions. The noise level was measured at an unwind speed of 140 feet per minute for all films. The baseline noise level for unwind apparatus with no film was 80 db. Example 4 is a monolayer film of linear low density copolymer of ethylene and another alpha olefin (LLDPE) with polyisobutylene (PIB) as the cling agent. Example 5 is a blend of LLDPE and a minor proportion of low density polyethylene (LDPE) with PIB as the cling agent. Example 6 is 3 layer ABC film where layer A is an ethylene-methylacrylate copolymer employed as the cling surface, layer B is an LLDPE layer and layer C is a blend of LLDPE and a minor amount of LDPE. Example 7 is a 3 layer of BAB film, where layer A is a core layer of LDPE and layers B each are LLDPE containing at least 3.5 wt % of n-hexane extractibles as the cling agent. The following Table shows the unwind noise level of each film.

TABLE

| STRETCH FILM UNWIND NOISE | | | |
|---|---|---|---|
| | GAUGE | CLING MECHANISM | CLING LEVEL (Grams) | UNWIND NOISE (decibels) |
| Example 4 | 80 | PIB | 240 | 92–100 dB |
| Example 5 | 60 | PIB | 180 | 90–92 dB |
| Example 6 | 80 | EMA | 160 | 104–108 dB |
| Example 7 | 80 | n-Hexane Extractable | 220 | 82 dB |

It will be noted that Example 7, illustrating the present invention has an excellent cling level and an outstandingly low unwind noise level. This is better than any known stretch cling film. In addition this film is the only film that registered a constant decibel reading throughout the unwind.

What is claimed is:

1. A method of packaging an article comprising providing a stretch wrap film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 140 grams to itself or other surfaces by virtue of the presence of said n-hexane extractibles without the addition of a cling additive to the film, wrapping an article in said film.

2. A method of packaging an article comprising providing a stretch wrap film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles as a cling agent, said film having an unwind noise level of less than 90 decibels, wrapping an article in said film.

3. The method of packaging an article as recited in claim 1 said film having a film stretch capability of up to 400 linear percent.

4. The method of packaging an article as recited in claim 3 wherein the high n-hexane extractible LLDPE resins have a density range from about 0.905 to about 0.940 gm/cc.

5. The method of packaging an article as recited in claim 4 wherein the stretch wrap film has a melt index of from about 1 to about 6.

6. The method of packaging an article as recited in claim 5 wherein the LLDPE containing layer further comprises an EVA copolymer, said LLDPE resins possessing low levels of n-hexane extractibles or blends thereof.

7. The method of packaging an article as recited in claim 5 wherein the LLDPE containing layer further comprises an HPLDPE copolymer, said LLDPE resins possessing low levels of n-hexane extractibles or blends thereof.

8. The method of packaging an article as recited in claim 5 wherein the LLDPE containing layer further comprises a second LLDPE copolymer, said LLDPE resins possessing low levels of n-hexane extractibles or blends thereof.

9. The method of packaging an article as recited in claim 2 said film having a film stretch capability of up to 400 linear percent.

10. The method of packaging an article as recited in claim 9 wherein the high n-hexane extractible LLDPE resins have a density range from about 0.905 to about 0.940 gm/cc.

11. The method of packaging an article as recited in claim 10 wherein the stretch wrap film has a melt index of from about 1 to about 6.

12. The method of packaging an article as recited in claim 11 wherein the LLDPE containing layer further comprises an EVA copolymer, said LLDPE resins possessing low levels of n-hexane extractibles or blends thereof.

13. The method of packaging an article as recited in claim 11 wherein the LLDPE containing layer further comprises an HPLDPE copolymer, said LLDPE resins possessing low levels of n-hexane extractibles or blends thereof.

14. The method of packaging an article as recited in claim 18 wherein the LLDPE containing layer further comprises a second LLDPE copolymer, said LLDPE resins possessing low levels of n-hexane extractibles or blends thereof.

15. The method of packaging an article as recited in claims 1, 2, 6, 7, 8, 12, 13 or 14 wherein the LLDPE containing layer further comprises polyisobutylene.

16. The method of packaging an article as recited in claim 15 wherein the polyisobutylene has a number average molecular weight in the range of from about 1,000–3,000 grams per mole.

17. The method of packaging an article as recited in claim 1 wherein said roll has an unwind noise level of less than 90 decibels.

18. The method of packaging an article as recited in claim 17 wherein said film exhibits a cling force of greater than 140 grams.

19. The method of packaging an article as recited in claims 1 or 2 wherein the article includes a pallet.

20. An article packaged with an overwrap of a stretch film in accordance with the method recited in claim 1, said stretch film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 140 grams to itself or other surfaces by virtue of the presence of said n-hexane extractibles without the addition of a cling additive to the film.

21. An article packaged with an overwrap of a stretch film in accordance with the method recited in claim 2, said stretch film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles as a cling agent, said film having an unwind noise level of less than 90 decibels.

22. The article recited in claim 20 having a film stretch capability of up to 400 linear percent.

23. The article recited in claim 22 wherein the high n-hexane extractible LLDPE resins have a density range from about 0.905 to about 0.940 gm/cc.

24. The article recited in claim 23 wherein the stretch wrap film has a melt index of from about 1 to about 6.

25. The article recited in claim 24 wherein the LLDPE containing layer further comprises an LLDPE copolymer, said LLDPE resins possessing low levels of n-hexane extractibles or blends thereof.

26. The article recited in claim 24 wherein the LLDPE containing layer further comprises an EVA copolymer, said LLDPE resins possessing low levels of n-hexane extractibles or blends thereof.

27. The article recited in claim 24 wherein the LLDPE containing layer further comprises an HPLDPE copolymer, said LLDPE resins possessing low levels of n-hexane extractibles or blends thereof.

28. The article recited in claim 21 having a film stretch capability of up to 400 linear percent.

29. The article as recited in claim 28 wherein the high n-hexane extractible LLDPE resins have a density range from about 0.905 to about 0.940 gm/cc.

30. The article recited in claim 29 wherein the stretch wrap film has a melt index of from about 1 to about 6.

31. The article recited in claim 30 wherein the LLDPE containing layer further comprises a second LLDPE copolymer, said LLDPE resins possessing low levels of n-hexane extractibles or blends thereof.

32. The article recited in claim 30 wherein the LLDPE containing layer further comprises an EVA copolymer, said LLDPE resins possessing low levels of n-hexane extractibles or blends thereof.

33. The article recited in claim 30 wherein the LLDPE containing layer further comprises an HPLDPE copolymer, said LLDPE resins possessing low levels of n-hexane extractibles or blends thereof.

34. The article as recited in claims 20, 21, 25, 26, 27, 31, 32 or 33 wherein the LLDPE containing layer further comprises polyisobutylene.

35. The article as recited in claim 34 wherein the polyisobutylene has a number average molecular weight in the range of from about 1,000–3,000 grams per mole.

36. The article as recited in claims 20 or 21 wherein the article includes a pallet.

37. A method of packaging an article comprising providing a stretch wrap film comprising at least two layers, an outer surface or skin layer comprising a linear low density copolymer of ethylene and one to about ten weight percent of an alpha olefin of from 4 to 10 carbon atoms, said copolymer containing from 3.5 to about 15 weight percent of n-hexane extractibles, said second layer comprising a flexible film forming resing possessing little, if any, inherent cling property, said stretch film having a cling force of at least 140 grams to itself or other surfaces by virtue of the presence of said n-hexane extractibles without the addition of a cling additive to the film, wrapping an article in said film.

38. The method of packaging an article according to claim 37 wherein the LLDPE containing layer further comprises polyisobutylene.

39. The method of packaging an article according to claim 38 wherein the polyisobutylene has a number average molecular weight in the range of from about 1,000–3,000 grams per mole.

40. A method of packaging an article comprising providing stretch film comprising at least three layers having two outer layers and one core layer, said outer layers each comprising a linear low density copolymer of ethylene and one to about ten weight percent of an alpha olefin of from 4 to 10 carbon atoms, said copolymer containing from 3.5 to about 15 weight percent of n-hexane extractibles, said core layer comprising a flexible film forming resin possessing little, if any, inherent cling property, said stretch film having a cling force of at least 140 grams to itself or other surfaces by virtue of the presence of said n-hexane extractibles and without the addition of a cling additive to the film, wrapping an article in said film.

41. The method of packaging an article according to claim 40 wherein the LLDPE containing layer further comprises polyisobutylene.

42. The method of packaging an article according to claim 41 wherein the polyisobutylene has a number average molecular weight in the range of from about 1,000–3,000 grams per roll.

43. An article packaged with an overwrap of a stretch film in accordance with the method recited in claim 32, said stretch film comprising at least two layers, an outer surface or skin layer comprising a linear low density copolymer of ethylene and one to about ten weight percent of an alpha olefin of from 4 to 10 carbon atoms, said copolymer containing from 3.5 to about 15 weight percent of n-hexane extractibles, said second layer comprising a flexible film forming resin possessing little, if any, inherent cling property, said stretch film having a cling force of at least 140 grams to itself or other surfaces by virtue of the presence of said n-hexane extractibles without the addition of a cling additive to the film.

44. The article of claim 43 wherein the LLDPE containing layer further comprises polyisobutylene.

45. The article of claim 44 wherein the polyisobutylene has a number average nolecular weight in the range of from about 1,000–3,000 gram per mole.

46. An article packaged with an overwrap of a stretch film in accordance with the method recited in claim 35, said stretch film comprising at least three layers having two outer layers and one core layer, said outer layers each comprising a linear low density copolymer of ethylene and one to about ten weight percent of an alpha olefin of from 4 to 10 carbon atoms, said copolymer containing from 3.5 to about 15 weight percent of n-hexane extractibles, said core layer comprising a flexible film forming resin possessing little, if any, inherent cling property, said stretch film having a cling force of at least 140 grams to itself or other surfaces by virtue of the presence of said n-hexane extractibles and without the addition of a cling additive to the film.

47. The article of claim 46 wherein the LLDPE containing layer further comprises polyisobutylene.

48. The article of claim 47 wherein the polyisobutylene has a number average molecular weight in the range of from about 1,000–3,000 grams per roll.

49. The method of packaging an article according to claim 37 wherein said second layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

50. The method of packaging an article according to claim 40 wherein the core layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

51. The method of packaging an article according to claim 43 wherein the second layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

52. The method of packaging an article according to claim 46 wherein the core layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

53. A method of packaging an article comprising providing a stretch wrap film comprising at least one thin layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 140 grams to itself or other surfaces by virtue of the presence of said n-hexane extractibles without the addition of a cling additive to the film and in its overlapped condition can resist the tension forces involved as a result of stretching the film to within 200 to 400 linear percent, wrapping an article in said film.

54. The method of packaging an article as recited in claim 53 wherein the high n-hexane extractible LLDPE resins have a density range from about 0.905 to about 0.940 gm/cc.

55. The method of packaging an article as recited in claim 54 wherein the stretch wrap film has a melt index of from about 1 to about 6.

56. The method of packaging an article as recited in claim 55 wherein the LLDPE containing layer further comprises an EVA copolymer, said LLDPE resins possessing low levels of n-hexane extractibles or blends thereof.

57. The method of packaging an article as recited in claim 55 wherein the LLDPE containing layer further comprises an HPLDPE copolymer, said LLDPE resins possessing low levels of n-hexane extractibles or blends thereof.

58. The method of packaging an article as recited in claim 55 wherein the LLDPE containing layer further comprises a second LLDPE copolymer, said LLDPE resins possessing low levels of n-hexane extractibles or blends thereof.

59. The method of packaging an article as recited in claims 53, 56, 57 or 58 wherein the LLDPE containing layer further comprises polyisobutylene.

60. The method of packaging an article as recited in claim 59 wherein the polyisobutylene has a number average molecular weight in the range of from about 1,000–3,000 grams per mole.

61. The method of packaging an article as recited in claims 1, 2, 37, 40, 43, 46 or 53 wherein said stretch wrap film is a cast stretch film.

62. A method of packaging an article comprising providing a stretch wrap film comprising a film of at least three layers ABC, having a non-cling outer exterior surface layer C, layers A and B each comprising linear low density copolymer of ethylene and one to about ten weight percent of an alpha olefin of from 4 to 10 carbon atoms, said copolymers containing from 3.5 to about 15 weight percent of n-hexane extractibles, said stretch film having a cling force of at least 140 grams to itself or other surfaces by virtue of the presence of said n-hexane extractibles and without the addition of a cling additive to the film, wherein said stretch film in its stretched and overlapped condition has a cling force to itself which successfully resists its tension-wrapped force.

63. An article packaged with an overwrap of a stretch film in accordance with the method recited in claim 62 wherein a non-cling outer surface layer comprises anti-cling additives said anti-cling additives are selected from the group of crystalline and amorphous silicas, a synthetic sodium aluminum silicate, diatomaceous earth and talc.

64. An article packaged with an overwrap of a stretch film in accordance with the method recited in claim 63 wherein the high n-hexane extractible LLDPE resins have a density range from about 0.905 to about 0.940 gm/cc.

65. An article packaged with an overwrap of a stretch film in accordance with the method recited in claim 64 wherein the stretch wrap film has a melt index of from about 1 to about 6.

66. An article packaged with an overwrap of a stretch film in accordance with the method recited in claim 65 wherein the LLDPE containing layer further comprises an EVA copolymer, said LLDPE resins possessing low levels of n-hexane extractibles or blends thereof.

67. An article packaged with an overwrap of a stretch film in accordance with the method recited in claim 66 wherein the LLDPE containing layer further comprises an HPLDPE copolymer, said LLDPE resins possessing low levels of n-hexane extractibles or blends thereof.

68. An article packaged with an overwrap of a stretch film in accordance with the method recited in claims 62, 63, 64, 65, 66 or 67 wherein the LLDPE containing layer further comprises polyisobutylene.

69. An article packaged with an overwrap of a stretch film in accordance with the method recited in claim 68 wherein the polyisobutylene has a number average molecular weight in the range of from about 1,000–3,000 grams per mole.

70. A method of packaging an article comprising providing a stretch wrap film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 100 grams to itself or other surfaces by virtue of the presence of said n-hexane extractibles without the addition of a cling additive to the film, wrapping an article in said film.

71. The method of packaging an article as recited in claim 70 said film having a film stretch capability of up to 400 linear percent.

72. The method of packaging an article as recited in claim 71 wherein the high n-hexane extractible LLDPE resins have a density range from about 0.905 to about 0.940 gm/cc.

73. The method of packaging an article as recited in claim 72 wherein the stretch wrap film has a melt index of from about 1 to about 6.

74. The method of packaging an article as recited in claim 73 wherein the LLDPE containing layer further comprises an EVA copolymer, said LLDPE resins possessing low levels of n-hexane extractibles or blends thereof.

75. The method of packaging an article as recited in claim 73 wherein the LLDPE containing layer further comprises an HPLDPE copolymer, said LLDPE resins possessing low levels of n-hexane extractibles or blends thereof.

76. The method of packaging an article as recited in claim 73 wherein the LLDPE containing layer further comprises a second LLDPE copolymer, said LLDPE resins possessing low levels of n-hexane extractibles or blends thereof.

77. The method of packaging an article as recited in claim 70 wherein the LLDPE containing layer further comprises polyisobutylene.

78. The method of packaging an article as recited in claim 77 wherein the polyisobutylene has a number average molecular weight in the range of from about 1,000– 3,000 grams per mole.

79. The method of packaging an article as recited in claim 70 wherein the article includes a pallet.

80. The method of packaging an article as recited in claim 70 wherein said stretch wrap film has a cling force of at least 163 grams to itself or other surfaces.

81. The method of packaging an article as recited in claim 80 wherein said stretch wrap film has a cling force of at least 200 grams to itself or other surfaces.

82. An article packaged with an overwrap of a stretch film in accordance with the method recited in claim 70, said stretch film comprising at least one thin skin or outer surface layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 100 grams to itself or other surfaces by virtue of the presence of said n-hexane extractibles without the addition of a cling additive to the film.

83. The article recited in claim 82 having a film stretch capability of up to 400 linear percent.

84. The article recited in claim 83 wherein the high n-hexane extractible LLDPE resins have a density range from about 0.905 to about 0.940 gm/cc.

85. The article recited in claim 84 wherein the stretch wrap film has a melt index of from about 1 to about 6.

86. The article recited in claim 85 wherein the LLDPE containing layer further comprises an LLDPE copolymer, said LLDPE resins possessing low levels of n-hexane extractibles or blends thereof.

87. The article recited in claim 85 wherein the LLDPE containing layer further comprises an EVA copolymer, said LLDPE resins possessing low levels of n-hexane extractibles or blends thereof.

88. The article recited in claim 85 wherein the LLDPE containing layer further comprises an HPLDPE copolymer, said LLDPE resins possessing low levels of n-hexane extractibles or blends thereof.

89. The article as recited in claim 82 wherein the LLDPE containing layer further comprises polyisobutylene.

90. The article as recited in claim 89 wherein the polyisobutylene has a number average molecular weight in the range of from about 1,000–3,000 grams per mole.

91. The article as recited in claim 82 wherein the article includes a pallet.

92. The article as recited in claim 84 wherein said stretch wrap film has a cling force of at least 163 grams to itself or other surfaces.

93. The article as recited in claim 89 wherein said stretch wrap film has a cling force of at least 200 grams to itself or other surfaces.

94. A method of packaging an article comprising providing a stretch wrap film comprising at least two layers, an outer surface or skin layer comprising a linear low density copolymer of ethylene and one to about ten weight percent of an alpha olefin of from 4 to 10 carbon atoms, said copolymer containing from 3.5 to about 15 weight percent of n-hexane extractibles, said second layer comprising a flexible film forming resin possessing little, if any, inherent cling property, said stretch film having a cling force of at least 100 grams to itself or other surfaces by virtue of the presence of said n-hexane extractibles without the addition of a cling additive to the film, wrapping an article in said film.

95. The method of packaging an article according to claim 94 wherein the LLDPE containing layer further comprises polyisobutylene.

96. The method of packaging an article according to claim 95 wherein the polyisobutylene has a number average molecular weight in the range of from about 1,000–3,000 grams per mole.

97. The method of packaging an article according to claim 94 wherein said stretch wrap film has a cling force of at least 200 grams to itself or other surfaces.

98. A method of packaging an article comprising providing a stretch wrap film comprising at least three layers having two outer layers and one core layer, said outer layers each comprising a linear low density copolymer of ethylene and one to about ten weight percent of an alpha olefin of from 4 to 10 carbon atoms, said copolymer containing from 3.5 to about 15 weight percent of n-hexane extractibles, said core layer comprising a flexible film forming resin possessing little, if any, inherent cling property, said stretch film having a cling force of at least 100 grams to itself or other surfaces by virtue of the presence of said n-hexane extractibles and without the addition of a cling additive to the film, wrapping an article in said film.

99. The method of packaging an article according to claim 98 wherein the LLDPE containing layer further comprises polyisobutylene.

100. The method of packaging an article according to claim 99 wherein the polyisobutylene has a number average molecular weight in the range of from about 1,000–3,000 grams per roll.

101. The method of packaging an article according to claim 98 wherein said stretch wrap film has a cling force of at least 200 grams to itself or other surfaces.

102. The method of packaging an article according to claim 94 wherein said second layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

103. The method of packaging an article according to claim 98 wherein the core layer comprises a resin selected from the group of an LLDPE containing less than about 3 weight percent of n-hexane extractibles, a high pressure low density polyethylene, isotactic polypropylene, ethylene-propylene copolymer, polyester and a polyamide.

104. A method of packaging an article comprising providing a stretch wrap film comprising at least one thin layer of a linear low density copolymer of ethylene and one to about ten weight percent of an alpha olefin of from 4 to 10 carbon atoms, said copolymer containing from 3.5 to about 15 weight percent of n-hexane extractibles, having a cling force of at least 100 grams to itself or other surfaces by virtue of the presence of said n-hexane extractibles without the addition of a cling additive to the film and in its overlapped condition can resist the tension forces involved as a result of stretching the film from about 0 to 400 linear percent, wrapping an article in said film.

105. The method of packaging an article as recited in claim 104 wherein the high n-hexane extractible LLDPE resins have a density range from about 0.905 to about 0.940 gm/cc.

106. The method of packaging an article as recited in claim 105 wherein the stretch wrap film has a melt index of from about 1 to about 6.

107. The method of packaging an article as recited in claim 106 wherein the LLDPE containing layer further comprises an EVA copolymer, said LLDPE resins possessing low levels of n-hexane extractibles or blends thereof.

108. The method of packaging an article as recited in claim 106 wherein the LLDPE containing layer further comprises an HPLDPE copolymer, said LLDPE resins possessing low levels of n-hexane extractibles or blends thereof.

109. The method of packaging an article as recited in claim 106 wherein the LLDPE containing layer further comprises a second LLDPE copolymer, said LLDPE resins possessing low levels of n-hexane extractibles or blends thereof.

110. The method of packaging article as recited in claim 104 wherein the LLDPE containing layer further comprises polyisobutylene.

111. The method of packaging an article as recited in claim 110 wherein the polyisobutylene has a number average molecular weight in the range of from about 1,000–3,000 grams per mole.

112. The method of packaging an article as recited in claims 70, 94, 98 or 104 wherein said stretch wrap film is a cast stretch film.

113. The method of packaging an article according to claim 104 wherein said stretch wrap film has a cling force of at least 163 grams to itself or other surfaces.

114. The method of packaging an article according to claim 113 wherein said stretch wrap film has a cling force of at least 200 grams to itself or other surfaces.

115. A method of packaging an article comprising providing a stretch wrap film comprising a film of at least three layers ABC, having a non-cling outer exterior surface layer C, layers A and B each comprising linear low density copolymer of ethylene and one to about ten weight percent of an alpha olefin of from 4 to 10 carbon atoms, said copolymers containing from 3.5 to about 15 weight percent of n-hexane extractibles, said stretch film having a cling force of at least 100 grams to itself or other surfaces by virtue of the presence of said n-hexane extractibles and without the addition of a cling additive to the film, wherein said stretch film in its stretched and overlapped condition has a cling force to itself which successfully resists its tension-wrapped force.

116. An article packaged with an overwrap of a stretch film in accordance with the method recited in claim 115 wherein a non-cling outer surface layer comprises anti-cling additives said anti-cling additives are selected from the group of crystalline and amorphous silicas, a synthetic sodium aluminum silicate, diatomaceous earth and talc.

117. An article packaged with an overwrap of a stretch film in accordance with the method recited in claim 116 wherein the high n-hexane extractible LLDPE resins have a density range from about 0.905 to about 0.940 gm/cc.

118. An article packaged with an overwrap of a stretch film in accordance with the method recited in claim 117 wherein the stretch wrap film has a melt index of from about 1 to about 6.

119. An article packaged with an overwrap of a stretch film in accordance with the method recited in claim 118 wherein the LLDPE containing layer further comprises an EVA copolymer, said LLDPE resins possessing low levels of n-hexane extractibles or blends thereof.

120. An article packaged with an overwrap of a stretch film in accordance with the method recited in claim 118 wherein the LLDPE containing layer further comprises an HPLDPE copolymer, said LLDPE resins possessing low levels of n-hexane extractibles or blends thereof.

121. An article packaged with an overwrap of a stretch film in accordance with the method recited in claims 115 or 116 wherein the LLDPE containing layer further comprises polyisobutylene.

122. An article package with an overwrap of a stretch film in accordance with the method recited in claim 121 wherein the polyisobutylene has a number average molecular weight in the range of from about 1,000–3,000 grams per mole.

123. The article as recited in claim 115 wherein said stretch wrap film has a cling force of at least 200 grams to itself or other surface.

* * * * *